United States Patent Office 2,958,696
Patented Nov. 1, 1960

2,958,696

PROCESS FOR REDUCING VAT DYESTUFFS OF THE ANTHRAQUINONE SERIES TO THEIR LEUCO FORM

Wilhelm Eckert, Fritz Meininger, and Gerhard Pfeiffer, Frankfurt am Main, Germany, assignors to Farbwerke Hoechst Aktiengesellschaft vormals Meister Lucius & Brüning, Frankfurt am Main, Germany, a corporation of Germany No Drawing. Filed Feb. 11, 1957, Ser. No. 639,228

Claims priority, application Germany Feb. 15, 1956

3 Claims. (Cl. 260—316)

The present invention relates to an improved process for preparing leuco sulfuric acid esters of vat dyestuffs of the anthraquinone series, which under the conditions of the esterification with the use of reducing agents form other products than the normal leuco compounds. The new process comprises treating the finely dispersed vat dyestuffs with a metal and an anhydrous acid, if desired, with the addition of a diluent and then reacting the leuco compounds so obtained with sulfatizing agents.

For a long time the water-soluble leuco sulfuric acid ester salts of vat dyestuffs are of great importance for dyeing and printing textiles. Many processes for preparing this important class of dyestuffs have been proposed but only some of them have proved to be of value in practice. It is known, for example, to prepare leuco sulfuric acid esters directly from the vat dyestuff by reacting the latter with a metal and sulfur trioxide or a compound yielding sulfur trioxide, in the presence of a tertiary organic base. Furthermore, various bases have been proposed, which are especially suitable as medium for the reaction, such as pyridine, alpha-picoline or dimethylaniline.

In U.S. Patent No. 2,604,477 it has been proposed to use an organic amide which is derived from a secondary amine, preferably dimethylformamide, instead of pyridine or another tertiary base.

Another process commonly used for the preparation of leuco sulfuric acid esters of vat dyestuffs comprises diluting the tertiary organic base, for example pyridine, with an inert organic liquid, such as chlorobenzene, ethylene chloride or acetone or with an organic base, such as alpha-picoline or diethylcyclohexylamine and reacting the vat dyestuff in this mixture with a sulfatizing agent in the presence of a metal.

According to the process described in British Patent No. 274,156 leuco sulfuric acid esters of vat dyestuffs can also be prepared by reacting a quaternary ammonium halide in the presence of a metal in a tertiary organic base suspension with a vat dyestuff and then treating the mixture so obtained with a sulfatizing agent.

Furthermore, it has been proposed to conduct the esterification of vat dyestuffs in an aqueous medium with the use of esterifying agents which are stable in an aqueous alkaline suspension, for example the addition products of sulfur trioxide and tertiary aliphatic amines, such as trialkylamines or N-alkylmorpholines (U.S. Patent No. 2,403,266).

It is also known that a number of important vat dyestuffs of the anthraquinone series cannot or only with small yields be converted into leuco sulfuric acid esters by the methods usually known. The production of these compounds on an industrial scale is, however, uneconomical not only on account of the small yields but also in view of the fact that in certain cases products are obtained which cannot or only partially be converted into the original vat dyestuffs by the usual dyeing and printing processes, which means that the dyeings and prints produced with these leuco sulfuric acid esters partially differ considerably from those obtained by the normal dyeing and printing methods. These differences become evident by a deviation in shade and moderate fastness properties of the dyeings and prints. On account of these deficiencies the water-soluble leuco sulfuric acid esters of vat dyestuffs prepared by the usual method in the presence of pyridine, picoline or other tertiary bases, are in certain cases useless in the dyeing and printing industry.

In U.S. patent application Serial No. 612,596, filed September 28, 1956, and since abandoned, is described a process for producing leuco sulfuric acid esters of 1.1'.5.1''-trianthrimide-2.2'.6.2''-carbazole, wherein the leuco sulfuric acid esters obtainable by the methods indicated above are subsequently treated with an oxidizing agent effective in the alkaline range.

Now we have found that leuco sulfuric acid esters, which are of commercial value for printing and dyeing textile materials, can also be prepared from vat dyestuffs of the anthraquinone series which under the conditons of the esterification with the use of reducing agents form other products than the normal leuco compounds. The new process is characterized by treating finely dispersed vat dyestuffs with a metal, for example zinc dust, iron or copper powder, and an anhydrous acid, such as glacial acetic acid, mono-, di or trichloroacetic acid, hydrochloric acid, propionic acid, if desired with the addition of a diluent, and then reacting the leuco compounds so obtained with sulfatizing agents. When the reduction of the vat dyestuffs is carried out in the absence of a diluent, it is suitable to remove the acid from the reaction mixture prior to the treatment of the leuco compound with the sulfatizing agent, for example by distillation under reduced pressure.

As vat dyestuffs of the kind mentioned above there come into consideration, for example those dyestuffs which, upon the action of reducing agents, have the tendency of being converted from the leuco compound into the keto- or oxanthrone form (cf. Melliand Textilberichte, 28, pages 93, 136, 273 (1948)), such as some acylaminoanthraquinones, 1.5 - dibenzoylamino-4.8-dihydroxyanthraquinone, 4 - (p-chlorobenzoylamino)-1.9-anthrapyrimidine, simple anthrimides, unsubstituted carbazoles, such as 1.1'-dianthrimide-2.2'-carbazole, 1.1'.5.1'''-trianthrimide-2.2'.6.2''-carbazole, pyranthrones, for example the pyranthrone itself or the dyestuff from dibromobenzanthrone, pyrazolanthrone and alpha-aminoanthraquinone.

An essential feature of the present invention is based on the observation that the reduction of a vat dyestuff tending to the enole-keto-transposition is carried out in an acid medium, if desired in the presence of a diluent in which the conversion of the normal anthrahydroquinone form into its oxanthrone form is practically excluded. The leuco compounds are obtained with very good yields.

As sulfatizing agents there may be mentioned the products obtained by reacting sulfuric anhydride or a compound yielding the same and chlorosulfonic acid methylester with pyridine, dialkylanilines, such as 3- or 4 - chlorodimethylaniline, 4 - methyldimethylaniline, the homologs of pyridine, such as 2.6-lutidine, collidine, furthermore dialkylformamides. Mixtures of the beforementioned bases, especially of dialkylanilines or lutidine with dialkylformamides and sulfuric anhydride are likewise very suitable as sulfatizing agents.

The dyeings and prints produced according to the usual methods with the leuco sulfuric acid esters obtainable by the present invention are distinguished especially by the purity of the tint and by excellent fastness properties.

The following examples serve to illustrate the invention, but they are not intended to limit it thereto, the parts being by weight.

*Example 1*

5 parts of zinc dust and 6 parts of anhydrous acetic acid are introduced into a mixture of 10 parts of finely dispersed 1.1'.5'1''-trianthrimide-2.2'.6.2''-carbazole and 190 parts of ethylene chloride. The reaction mixture is stirred for 3 hours at 40° C. in a nitrogen atmosphere until the color of the solution has turned from yellow to black-brown. 50 parts of the product obtained from pyridine and sulfur trioxide are then added at 10° C. and sulfatization is brought about by stirring for 3 hours at 45° C. The mixture is then introduced into a sodium carbonate solution of 10% strength and the insoluble portions are removed by filtration. The residue is washed out with a hot sodium carbonate solution of 5% strength and the solvents are distilled off under reduced pressure. The leuco sulfuric acid ester can be salted out from the solution free from pyridine by means of potassium chloride. It is filtered off with suction, then pasted up with 1 part of sodium carbonate and 1.7 parts of molasses and dried under reduced pressure at 40° C.

*Example 2*

11 parts of zinc dust are added to a mixture of 10 parts of finely dispersed 1.1'.5.1''-trianthrimide-2.2'.6.2''-carbazole and 110 parts of anhydrous acetic acid and the whole is then stirred for 6 hours at 40° C. in a nitrogen atmosphere. When the reduction is complete, the acetic acid is completely distilled off under reduced pressure. To the remaining leuco compound is added a mixture of 80 parts of 2.6-lutidine, 250 parts of ethylene chloride and 30 parts of sulfur trioxide and the mixture is stirred for 30 minutes at 10° C. and then for 3½ hours at 50° C. The mixture is then stirred into a sodium carbonate solution of 10% strength and distilled under reduced pressure. The zinc residues are removed by filtration. The leuco sulfuric acid ester can easily be salted out from the solution free from lutidine with potassium chloride. It is filtered off with suction, stabilized as described in Example 1 and dried.

*Example 3*

11 parts of zinc dust are added to a mixture of 10 parts of finely dispersed 4.5'-dibenzoylamino-1.1'-dianthrimide-2.2'-carbazole and 220 parts of anhydrous acetic acid, and the mixture is then stirred for 4 hours at 40° C. in a nitrogen atmosphere. When the reduction is complete, the acetic acid is distilled off under reduced pressure. The remaining leuco compound is stirred for 30 minutes with 115 parts of ethylene chloride and at 10° C. a mixture of 60 parts of collidine (2.4.6-trimethylpyridine), 150 parts of ethylene chloride and 30 parts of sulfur trioxide is then added. The reaction mixture is stirred for 30 minutes at 10° C. and then for 3½ hours at 50° C. and worked up as described in Example 1, and isolated.

*Example 4*

15 parts of zinc dust and 16 parts of anhydrous acetic acid are introduced into a mixture of 20 parts of finely dispersed 1.1'-dianthrimide-2.2'-carbazole and 320 parts of ethylene chloride. The reaction mixture is stirred for 5 hours at 40° C. in a nitrogen atmosphere until the solution has assumed a yellow-green coloration. After cooling to 2° C., the product obtained from 74 parts of chlorosulfonic acid methylester and 110 parts of dimethylformamide, is added to the mixture within 30 minutes and the whole is stirred for 90 minutes at 0–5° C. The mixture is then introduced into a sodium carbonate solution of 10% strength, filtered and then distilled under reduced pressure. The leuco sulfuric acid ester is salted out with potassium chloride, filtered off with suction, pasted up with 3,4 parts of molasses and 2 parts of sodium carbonate and dried at 45° C. under reduced pressure. The greenish yellow dyestuff powder dissolves in water to a yellow solution.

*Example 5*

9 parts of zinc dust and 8 parts of glacial acetic acid are added to a suspension of 10 parts of finely dispersed 1.1'-dianthrimide-2.2'-carbazole in 115 parts of ethylene chloride. The mixture is stirred for 5 hours at 40° C. in a nitrogen atmosphere. It is then cooled to 10° C. and a sulfatizing mixture is added which has been prepared at 0° C. from 150 parts of ethylene chloride, 30 parts of sulfur trioxide and 50 parts of 2.6-lutidine or collidine. The reaction mixture is stirred for 30 minutes at 10° C. and then for 3½ hours at 50° C. It is then poured into a solution of 50 parts of sodium carbonate or 20 parts of sodium hydroxide in 500 parts of water. Ethylene chloride and lutidine or collidine are then distilled off at 50–60° C. under reduced pressure, while 500 parts of water are added twice. After filtration at 60° C. and washing with hot water, the leuco sulfuric acid ester is salted out with potassium chloride from the filtrate which is free from lutidine or collidine. The ester salt is suction-filtered, stabilized with 0.5 part each of sodium carbonate, urea and molasses, and dried at 40° C. under reduced pressure.

*Example 6*

9 parts of zinc dust and 8 parts of glacial acetic acid are added to a suspension of 10 parts of finely dispersed 1.1'.5.1''-trianthrimide-2.2'.6.2''-carbazole in 115 parts of ethylene chloride. The mixture is stirred for 5 hours at 40° C. in a nitrogen atmosphere. The whole is then cooled to 10° C. and a sulfatizing mixture prepared at 0° C. from 150 parts of ethylene chloride, 60 parts of collidine and 30 parts of sulfur trioxide is added. The whole is stirred for 30 minutes at 10° C. and then for 3½ hours at 50° C. The reaction mixture is then poured into a solution of 50 parts of sodium carbonate or 20 parts of sodium hydroxide in 500 parts of water and allowed to stand over night. The ethylene chloride and collidine are then distilled off in vacuo at 50–60° C., while 500 parts of water are added twice. The mixture is filtered off at 60° C. and the residue is washed well with hot water. The leuco sulfuric acid ester can easily be salted out with potassium chloride from the filtrate which is free from collidine. The ester salt which has separated is filtered off with suction, triturated with 0.5 part each of sodium carbonate, molasses and urea and dried at 40° C. in vacuo.

*Example 7*

9 parts of zinc dust and 8 parts of glacial acetic acid are introduced into a suspension of 10 parts of finely dispersed 1.1'.5.1''-trianthrimide - 2.2'.6.2'' - carbazole in 115 parts of ethylene chloride. The mixture is stirred for 5 hours at 40° C. in a nitrogen atmosphere. It is then cooled to 10° C. and a sulfatizing mixture prepared at 0° C. from 150 parts of ethylene chloride, 80 parts of 2.6-lutidine and 30 parts of sulfur trioxide is added. The whole is stirred for 30 minutes at 10° C. and then for 3½ hours at 50° C. The reaction mixture is then poured into a solution of 50 parts of sodium carbonate or 20 parts of sodium hydroxide in 500 parts of water and allowed to stand over night. The ethylene chloride and lutidine are distilled off at 50–60° C. under reduced pressure, while 500 parts of water are added twice. The mixture is filtered off at 60° C. and the residue is washed well with hot water. The leuco sulfuric acid ester can easily be salted out with potassium chloride from the filtrate which is free from lutidin. The precipitated ester salt is filtered off with suction, triturated with 0.5 parts each of sodium carbonate, molasses and urea and dried at 40° C. under reduced pressure.

Example 8

A suspension of 10 parts of finely dispersed 4.5'-dibenzoylamino-1.1'-dianthrimide - 2.2' - carbazole, 115 parts of ethylene chloride, 9 parts of zinc dust and 8 parts of anhydrous acetic acid is stirred for 5 hours at 40° C. in a nitrogen atmosphere. The mixture is then cooled to 10° C. and a sulfatizing mixture is added which has been prepared at 0° C. from 150 parts of ethylene chloride, 30 parts of sulfur trioxide and 60 parts of 2.6-lutidine or collidine. The whole is stirred for 30 minutes at 10° C. and then for 3½ hours at 50° C. The reaction mixture is introduced into a solution of 50 parts of sodium carbonate or 20 parts of sodium hydroxide in 500 parts of water. The ethylenechloride and lutidine or collidine are then distilled off at 50–60° C. under reduced pressure while 500 parts of water are added twice. The reaction mass is filtered off at 60° C. and the filter residue is well washed with hot water. The leuco sulfuric acid ester can easily be salted out with potassium chloride from the filtrate which is free from lutidine or collidine. The precipitated ester salt is filtered off with suction, stabilized by triturating it with 0.5 part each of sodium carbonate, molasses and urea and dried in vacuo at 40° C.

Example 9

12 parts of copper powder and 6 parts of anhydrous hydrochloric acid are added to a suspension of 15 parts of finely dispersed 1.1'.5.1" - trianthrimide - 2.2'.6.2"-carbazole in 172.5 parts of ethylene chloride. The mixture is stirred for 2 hours at 40° C. in a carbon dioxide atmosphere, another 6 parts of anhydrous hydrochloric acid are then added and stirring is continued for a further 2 hours at 40° C. After cooling to 10° C., a mixture prepared at 0° C. from 225 parts of ethylene chloride, 120 parts of 2.6-lutidine and 45 parts of sulfur trioxide is added. The whole is stirred for 30 minutes at 10° C. and then for 3½ hours at 50° C. The reaction mixture is then introduced into a solution of 75 parts of sodium carbonate in 750 parts of water. The mixture is distilled in vacuo in order to remove the solvents, then filtered off at 60° C. and the residue is washed well with hot water. The leuco sulfuric acid ester is salted out from the filtrate with potassium chloride, filtered off with suction and stabilized as described in the foregoing examples.

Example 10

18 parts of zinc dust and 16 parts of propionic acid are introduced into a suspension of 20 parts of finely dispersed 1.1'.5.1" - trianthrimide - 2.2'.6.2" - carbazole in 230 parts of ethylene chloride. The mixture is stirred for 5 hours at 40° C. in a nitrogen atmosphere. It is then cooled to 10° C. and a sulfatizing mixture prepared at 0° C. from 300 parts of ethylene chloride, 160 parts of 2.6-lutidine and 60 parts of sulfur trioxide is added. The whole is stirred for 30 minutes at 10° C. and then for 3½ hours at 50° C. The reaction mixture is then poured into a solution of 100 parts of sodium carbonate or 40 parts of sodium hydroxide in 1000 parts of water and allowed to stand over night. Ethylene chloride and lutidine are then distilled off in vacuo at 50–60° C. while 1000 parts of water are added twice. The mixture is filtered off at 60° C. and the filtered residue is washed well with hot water. The leuco sulfuric acid ester can easily be salted out with potassium chloride from the filtrate which is free from lutidine.

Example 11

14 parts of zinc dust and 16 parts of anhydrous acetic acid are introduced, while stirring, into a mixture of 220 parts of ethylene chloride and 20 parts of finely dispersed 1.1'.5.1" - trianthrimide - 2.2'.6.2" - carbazole. The mixture is stirred for 6 hours at 40° C. in a nitrogen atmosphere. When the reduction is complete, the reaction mixture is combined with a sulfatizing mixture consisting of 195 parts of ethylene chloride, 142 parts of 4-chloro-dimethylaniline and 60 parts of sulfur trioxide. The whole is stirred for 1½ hours at 55–57° C. and then introduced into a sodium carbonate solution. The residue is removed by filtration and washed. The filtrate is separated from the phase immiscible with water, if desired concentrated under reduced pressure and mixed with potassium chloride. The isolated leuco sulfuric acid ester is stabilized by the addition of 2.5 parts of molasses and 1.5 parts of sodium carbonate.

According to the usual methods of application the leuco sulfuric acid ester so obtained yields clear yellow tints of excellent fastness properties.

Example 12

A mixture of 10 parts of finely dispersed 4.5'-dibenzoylamino-1.1'-dianthrimide-2.2'-carbazole, 105 parts of ethylene chloride, 7 parts of zinc dust and 8 parts of anhydrous acetic acid are stirred for ½ hour at 40° C. and then for 5½ hours at 65° C. in a nitrogen atmosphere. The mixture is then introduced into a sulfatizing mixture of 98 parts of ethylene chloride, 71 parts of 4-chloro-dimethylaniline and 30 parts of sulfur trioxide and stirred for 1½ hours at 55–57° C. The mixture is introduced into an aqueous sodium carbonate solution, the residue is removed by filtration and washed. The phase of the filtrate which contains the leuco sulfuric acid ester is concentrated under reduced pressure and potassium chloride is added. The separated ester salt is filtered off with suction, triturated with 0.5 part each of sodium carbonate, molasses and urea and dried at 50° C. under reduced pressure.

Instead of anhydrous acetic acid there may also be used 12.5 parts of monochloroacetic acid or 7.8 parts of anhydrous hydrochloric acid.

Example 13

11 parts of zinc dust are introduced into a mixture of 10 parts of finely dispersed 1.1'-dianthrimide-2.2'-carbazole and 110 parts of anhydrous acetic acid and the mixture is then stirred for 6 hours at 38° C. in a nitrogen atmosphere. When the reduction is complete, the acetic acid is distilled off under reduced pressure. To the remaining leuco compound is added a mixture of 187 parts of ethylene chloride, 71 parts of 4-chloro-dimethylaniline and 30 parts of sulfur trioxide and the whole is stirred for 1½ hours at 55–57° C. The mixture is added to an aqueous sodium carbonate solution, the residue is removed by filtration and washed. The aqueous portion of the filtrate is concentrated in vacuo and potassium chloride is added. The leuco sulfuric acid ester is triturated with 0.5 part each of sodium carbonate and molasses and dried at 57° C. under reduced pressure.

Example 14

10.5 parts of zinc dust and 12 parts of glacial acetic acid are introduced into a suspension of 10 parts of finely dispersed 5.5'-dibenzoylamino-1.1'-dianthrimide - 2.2' - carbazole in 215 parts of ethylene chloride. The mixture is stirred for 5 hours at 50° C. in a nitrogen atmosphere and then added to a sulfatizing mixture of 145 parts of ethylene chloride, 70 parts of 4-chloro-dimethylaniline and 30 parts of sulfur trioxide and the whole is stirred for 1½ hours at 55–60° C. The reaction mixture is introduced into an aqueous sodium carbonate solution and the residues are removed by filtration. The leuco sulfuric acid ester is worked up as described in Example 11 and isolated.

*Example 15*

11 parts of zinc dust are introduced into a mixture of 10 parts of finely dispersed 1.1′.5.1″-trianthrimide-2.2′.6.2″-carbazole and 110 parts of anhydrous acetic acid and the whole is then stirred for 6 hours at 40° C. in a nitrogen atmosphere. When the reduction is complete, the acetic acid is completely distilled off under reduced pressure. To the remaining leuco compound is added a mixture of 175 parts of ethylene chloride, 71 parts of 4-chloro-dimethylaniline and 30 parts of sulfur trioxide and the mass is stirred for 1½–2 hours at 55–57° C. The mixture is introduced into an aqueous sodium carbonate solution, the residue is removed by filtration and washed. The leuco sulfuric acid ester is worked up as described in Example 11 and stabilized.

*Example 16*

7 parts of zinc dust are introduced into a mixture of 9.7 parts of finely dispersed 4.5′-dibenzoylamino-1.1′-dianthrimide-2.2′-carbazole, 195 parts of ethylene chloride and 8 parts of anhydrous acetic acid, and the mixture is stirred for 6 hours at 40° C. When the reduction is complete, the leuco compound is combined with a mixture of 90 parts of ethylene chloride, 49 parts of 4-chlorodimethylaniline, 19.5 parts of dimethylformamide and 29.5 parts of sulfur trioxide and the whole is stirred for 35 minutes at 55–57° C. The mixture is introduced into an aqueous sodium carbonate solution, the residue is removed by filtration and washed. The aqueous portion of the filtrate is concentrated in vacuo and potassium chloride is added. The ester salt is filtered off with suction, stabilized and dried.

*Example 17*

A mixture of 10 parts of finely dispersed 1.1′-dianthrimide-2.2′-carbazole, 123 parts of ethylene chloride, 7.5 parts of zinc dust and 8 parts of anhydrous acetic acid is stirred for 6 hours at 44° C. in a carbon dioxide atmosphere. The mixture is then introduced into a sulfatizing mixture of 75 parts of ethylene chloride, 45 parts of 4-chloro-dimethylanaline, 18 parts of dimethylformamide and 25 parts of sulfur trioxide and the whole is stirred for 40 minutes at 55° C. The reaction mixture is then introduced into an aqueous sodium carbonate solution and insoluble residues are removed by filtration. The phase of the filtrate which contains the leuco sulfuric acid ester is concentrated under reduced pressure and potassium chloride is added. The precipitated ester salt is filtered off with suction, stabilized with sodium carbonate and dried.

*Example 18*

A mixture of 9.8 parts of finely dispersed 1.1′.5.1″-trianthrimide-2.2′.6.2″-carbazole, 110 parts of anhydrous acetic acid and 11 parts of zinc dust is stirred for 6 hours at 40° C. in a nitrogen atmosphere. When the reduction is complete, the acetic acid is completely distilled off under reduced pressure. To the remaining powder a mixture of 150 parts of ethylene chloride, 49.5 parts of 4-chloro-dimethylaniline, 20 parts of dimethylformamide and 29.5 parts of sulfur trioxide is added and the whole is stirred for 35 minutes at 55–57° C. The mixture is introduced into an aqueous sodium carbonate solution, the residue is removed by filtration and washed. The leuco sulfuric acid ester is isolated as described in Example 1 and dried.

*Example 19*

A mixture of 20 parts of finely dispersed 1.1′.5.1″-trianthrimide-2.2′.6.2″-carbazole, 130 parts of ethylene chloride, 13.8 parts of zinc dust and 16 parts of anhydrous acetic acid is stirred for 5 hours at 40° C. in a nitrogen atmosphere. When the reduction is complete, the reaction mixture is combined with a sulfatizing mixture consisting of 190 parts of ethylene chloride, 100 parts of 4-chloro-dimethylaniline, 42 parts of dimethylformamide and 59.5 parts of sulfur trioxide. The mixture is stirred for 35 minutes at 55–57° C. and then introduced into an excess of a sodium carbonate solution of 15% strength. The residue is removed by filtration and washed out. The filtrate is separated from the phase immiscible with water, concentrated under reduced pressure and potassium chloride is added. The precipitated ester salt is filtered off with suction, triturated with 2.5 parts each of sodium carbonate, molasses and urea, and dried in vacuo at 50° C. The separated and dried mixture of 4-chloro-dimethylaniline and ethylene chloride can be used again without previous separation.

*Example 20*

11 parts of zinc dust are introduced into a mixture of 10 parts of finely dispersed 1.1′-dianthrimide-2.2′-carbazole and 110 parts of anhydrous acetic acid, and the mixture is stirred for 6 hours at 40° C. in a nitrogen atmosphere. When the reduction has been terminated, the acetic acid is distilled off under reduced pressure. To the remaining leuco compound is added a mixture of 150 parts of ethylene chloride, 45 parts of 4-chloro-dimethylaniline, 18 parts of dimethylformamide and 25 parts of sulfur trioxide and the whole is stirred for 40 minutes at 55–57° C. The reaction mixture is then introduced into an aqueous sodium carbonate solution and separated from the residue by filtration. The aqueous phase of the filtrate is concentrated in vacuo and potassium chloride is added.

*Example 21*

20 parts of finely dispersed 1.1′.5.1″-trianthrimide-2.2′.6.2″-carbazole are reduced in a nitrogen atmosphere in a vigorously stirred mixture of 235 parts of ethylene chloride, 14 parts zinc dust and 16 parts of anhydrous acetic acid. The mixture is stirred for 5 hours at 40° C., and then combined with a sulfatizing mixture consisting of 200 parts of ethylene chloride, 70 parts of 2.6-dimethyl-pyridine, 42 parts of dimethylformamide and 60 parts of sulfur trioxide. The mixture is stirred for a further 30 minutes at 57° C. and then introduced into a sodium carbonate solution of 10% strength. The solvents are removed by distillation under reduced pressure, the insoluble residue is filtered off and the leuco sulfuric acid ester is precipitated from the filtrate by the addition of potassium chloride.

*Example 22*

10 parts of finely dispersed 1.1′-dianthrimide-2.2′-carbazole are reduced as described in Example 17 and then introduced into a mixture of 110 parts of ethylene chloride, 60 parts of 4-methyl-dimethylaniline, 21 parts of dimethyl-formamide and 30 parts of sulfur trioxide. The mixture is stirred for 60 minutes at 55–57° C. and then introduced into a sodium carbonate solution of 10 percent strength. The leuco sulfuric acid ester is isolated as described in Example 17.

Instead of 4-methyl-dimethylaniline there may also be used 55 parts of 3-chloro-dimethylaniline.

We claim:

1. In the process for preparing the leuco form of a difficultly reducible vat dyestuff selected from the group consisting of unsubstituted anthrimide carbazoles and benzoyl-amino substituted anthrimide carbazoles, the reducing step which consists of contacting the finely dispersed dyestuff at a temperature in the range from 35° C. to 70° C. with a finely divided metal selected from the group consisting of zinc, iron, and copper and an anhydrous acid of the group consisting of glacial acetic, monochloro acetic, dichloro acetic, trichloro acetic, hydrochloric, and propionic acids.

2. The process defined in claim 1 wherein the reduction of the vat dyestuff is carried out in the presence of a diluent.

3. The process as in claim 1 in which the reduction step is carried out in an inert atmosphere.

References Cited in the file of this patent

UNITED STATES PATENTS

| | | |
|---|---|---|
| 1,879,028 | Bauer et al. | Sept. 27, 1932 |
| 2,604,477 | Coffey et al. | July 22, 1952 |
| 2,660,580 | Von | Nov. 24, 1953 |
| 2,705,717 | Oppliger et al. | Apr. 5, 1955 |
| 2,784,198 | Peyer et al. | Mar. 5, 1957 |
| 2,803,630 | Oppliger et al. | Aug. 20, 1957 |

FOREIGN PATENTS

| | | |
|---|---|---|
| 315,597 | Switzerland | Aug. 31, 1956 |

OTHER REFERENCES

Barnett: Anthracene and Anthraquinone (1921), D. Van Nostrand Co., New York, N.Y., p. 119.